United States Patent [19]

Russell et al.

[11] 3,744,024

[45] July 3, 1973

[54] CIRCUIT FOR DETECTING THE PRESENCE OF OTHER THAN ONE-BIT-OUT-OF-N BITS

[75] Inventors: Stanley L. Russell, West Webster; Uwe A. Pommerening, Webster, both of N.Y.

[73] Assignee: Stromberg-Carlson Corporation, Rochester, N.Y.

[22] Filed: Jan. 3, 1972

[21] Appl. No.: 214,886

[52] U.S. Cl. .......... 340/146.1 AB

[51] Int. Cl. .......... H03k 13/32

[58] Field of Search .......... 340/146.1 AB; 235/153

[56] References Cited

UNITED STATES PATENTS

| | | | |
|---|---|---|---|
| 3,428,945 | 2/1969 | Toy | 340/146.1 AB |
| 3,541,507 | 11/1970 | Duke | 340/146.1 AB |
| 3,614,735 | 10/1971 | Mauger et al. | 340/146.1 AB |

OTHER PUBLICATIONS

Sellers et al., Error Detecting Logic for Digital Computers, McGraw-Hill Book Co., 1968, pp. 212–220.

*Primary Examiner*—Charles E. Atkinson
*Attorney*—Charles C. Krawczyk et al.

[57] ABSTRACT

A monitoring circuit is provided to detect a predetermined number of bits of information impressed on a plurality of signal lines. The monitoring circuit combines the plurality of signal lines into separate groups arranged so that each of the plurality of lines is common to two of the separate groups. The separate groups are next divided into two sets of groups arranged so that each of the two groups having a common signal line is in a different one of the sets of groups. Provision is then made to detect the presence of a predetermined number of bits of information in at least one of the sets of groups.

7 Claims, 12 Drawing Figures

CIRCUIT FOR DETECTING THE PRESENCE OF OTHER THAN ONE-BIT-OUT-OF-N BITS

BACKGROUND OF THE INVENTION

This invention relates to a logic circuit for detecting an error condition defined by the simultaneous presence of signals on more than one line of a plurality of lines and/or the absence of any signals on the plurality of lines.

Electronic systems frequently utilize various configurations of control circuits in the form of binary counter decoders, shift registers, ring counters, etc. In some instances, it is essential that only one bit of information be processed through a specific portion of the equipment in a given interval of time. For example, if a ring counter or a binary counter/decoder is used to control marking in a telephone system network, more than one path could erroneously be established if the circuit should contain more than one bit of information when it is interrogated for a free line. Thus, the detection of the presence of the excess bit must be quickly detected in order that the ring or binary counter can be preset into the single-bit condition or provide a switchover to a different ring counter or binary counter/decoder.

In "Error Detecting Logic For Digital Computers", by Sellers, Hsiao and Bearnson (McGraw-Hill, 1968), several methods of detecting other than one-out-of-N bits in a plurality of data lines are described. However, all of the methods described fail to provide a complete check of all the data lines in all the groups, as well as failing to provide a parallel arrangement whereby all the groups determined by a matrix configuration are checked continuously and simultaneously to provide a rapid detecting means.

In the U.S. Pat. No. 3,559,168, W.C. Carter, et al teaches a self-checking error checker for *k*-out-of-N coded data, including a special case of when *k*=1. In this approach, the data lines are divided into two groups. A checker comprising logic circuitry, obtains two outputs C1 and C2. If the circuitry being checked is error free and operating properly, the outputs C1 and C2 are complementary. If an error is present, the two outputs are the same. The versatility of the approach taught by Carter, et al does not provide a means to check the data lines completely. The described process will not detect the presence of two or more bits in the same group of data lines. Additionally, the logic circuitry does not offer a complete circuit for determining error conditions and lacks an inherent alarm determining circuitry therein.

It is an object of this invention to provide a new and improved circuit means for detecting the presence of other than one signal or bit of information on any one of a plurality of lines.

It is another object of the invention to provide a new and improved logic circuit for detecting the presence of other than one signal or bit on any one of a plurality of signal lines that requires less equipment and is more economical than the logic circuitry of the prior art.

Another object of this invention is to provide a new and improved logic circuit for detecting the presence of other than one bit of information on any one of a plurality of lines that can be interconnected with other like logic circuits to form a chain arrangement for checking a large number of lines wherein provisions are provided for detecting an error condition in the large number of lines.

It is still a further object of this invention to provide a new and improved circuit means for detecting an error condition defined by the simultaneous presence of signals on more than one line of a plurality of lines and/or the absence of any signals on the plurality of lines, that can be connected in a modular arrangement that can be readily expanded as the number of lines to be monitored increases.

BRIEF DESCRIPTION OF THE INVENTION

The circuit of the invention monitors a plurality of input signal lines for a valid condition defined by the presence of a single signal on any one of the plurality of input signal lines, and an error condition defined by either a signal on more than one of the input lines, or no signal at all. A circuit of this type is often defined as a one-out-of-N bit check circuit. If a large number of lines are being monitored, a plurality of such monitor circuits can be employed and interconnected in accordance with the invention to monitor the valid and error conditions.

The monitor circuit includes a gating circuit means receiving signals from the signal input lines and combines the signals in a matrix type configuration. The gating circuit includes two separate groups of matrix output signal lines. Signals received from the input signal lines are transmitted in such a manner that each signal appears on a matrix output signal line in each of the two groups. The signal gating circuit means, responsive to the signals on the matrix output signal lines proves a signal in response to a valid condition and another signal in response to an error condition.

In accordance to another embodiment of the invention, when monitoring a large number of input signal lines, a plurality of gating circuit means are connected to separate groups of input signal lines. Each of the gating circuit means provide "error" signal if a signal is present on more than one input signal line connected thereto, a "no bit" signal if no signals are present on any of the input signal lines connected thereto, and a "one bit" signal if one signal is present on only one of the input signal lines connected thereto. Circuit means, interconnecting the plurality of gating circuit means, is responsive to a plurality of "one bit" signals for generating an error signal. Additional circuit means are provided for interconnecting the plurality of gating circuit means and is responsive to the presence of a "no bit" signal from each of the plurality of gating circuits for generating an error signal.

DESCRIPTION OF THE INVENTION

Figure 1:
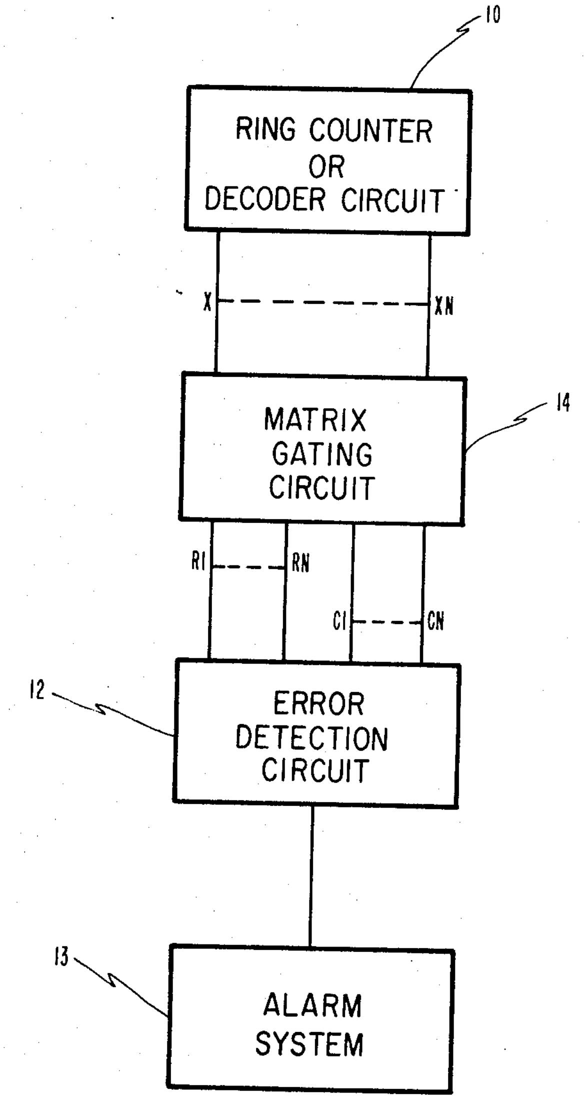
FIG. 1 is a block diagram of a signal circuit embodying means for detecting other than one-bit-out-of-N bits of information in the apparatus in accordance with the teachings of this invention.

With reference to FIG. 1, there is shown a signal circuit 10, such, for example, as a ring counter or decoding circuit. The signal circuit 10 is of particular importance in telephone switching systems in that the signal circuit 10 can function as a scanner to enable one telephone circuit of a plurality of telephone circuits at any time, such as, for example, one operator position. The signal circuit 10 has the capability to apply a signal to any one of a plurality of output lines X1–XN at any one time. Hence, a valid state condition prescribed for the signal circuit is that one, and only one, signal (bit of information) can be present on the output lines X1–XN at any one given time. Any conditional state wherein no bits, or more than one bit is present, is an error, or an alarm, condition.

At any one time, one output signal, usually either a high or a low signal, is applied to one of the output leads X1–XN while the other or opposite signal is applied to the remainder of the leads. The output lines X1–XN are connected to a matrix gating circuit 14 having a plurality of gate circuits that combine the signals on the leads X1–XN into two groups of a plurality of output circuits in an arrangement wherein a signal on each output line X1–XN is represented in one output circuit in each of the two groups. One group is designated as the group R (row) while the other group is designated as the group C (column). The output lines of groups C and R are connected to an error detection circuit 12 for monitoring the signal from the matrix output circuits R and C to determine if more than one output signal, or no output signal, is present on the output leads X1–XN at any one instant of time. If one bit is found on two or more of the output leads X1–XN, then the error, or alarm, condition is present. If no bit is present on any of the plurality of output leads X1–XN, then another error, or alarm, condition is present.

For situations wherein the number of lines N is very large (FIG. 2), several matrix gating circuits 14 can be used such, for example, as A, B, C and D, each of which are connected to separate groups of output lines from the signal circuit 10. As, for example, when N is large, such as 1,000 lines, each of the matrix gating circuits 14 (A, B, C and D) can, for example, handle 250 lines. A square matrix has been found to be the preferred matrix, wherein each of the matrices A, B, C and D is designed in a 16 by 16 configuration. Where a plurality of matrix gating circuits are used, the outputs thereof are applied to separate ones of a plurality of error detection circuits 12 (A, B, C and D). Separate error detection circuits 12 are connected to each matrix gating circuit and to each other to determine if more than one bit or no bits are present on the output lines X1–XN. This arrangement of matrix gating circuits and error detection circuits is capable of unlimited expandability. As the number of data lines are increased in the signal circuit 10, the number of matrix gating circuits and error detection circuits, all interconnected with each other and with the prior circuits as required, can be increased to provide a means for the complete interrogation of all the data lines of the circuit 10. Therefore, it can be seen that this arrangement can be expanded to any capacity as the needs require.

Figure 3:
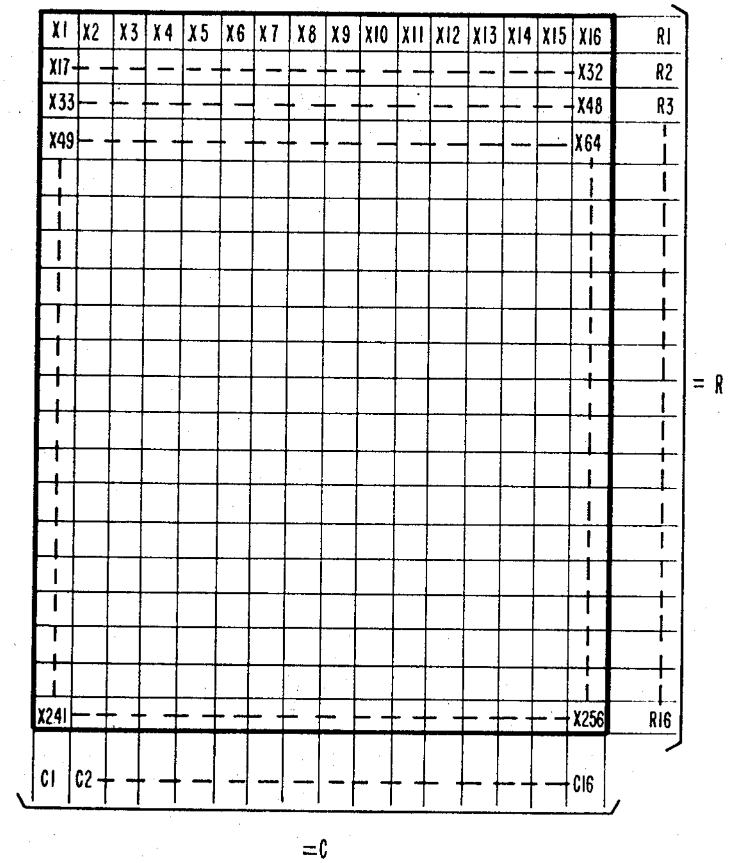
FIG. 3 is a matrix configuration exemplifying a portion of the teachings of this invention.

Referring now to FIG. 3, with 1,000 lines, each of the four matrix gating circuits A, B, C and D combine the signals on 250 separate signal circuit output lines into four separate sets, each set having two subsets of matrix output signals R and C. The matrix function is performed by OR gates, or the like. The signals on the output lines of the top horizontal row are OR'ed together (connected to separate inputs of an OR gate circuit) to form the output R1. The other horizontal rows are similarly OR'ed together to form the respective outputs R2, R3...R16. Likewise, the bits of the vertical columns are OR'ed together to form the outputs C1, C2, C3...C16. The error detection circuits monitor the outputs C and R to detect a combination wherein more than one bit or no bits are present.

Figure 7:
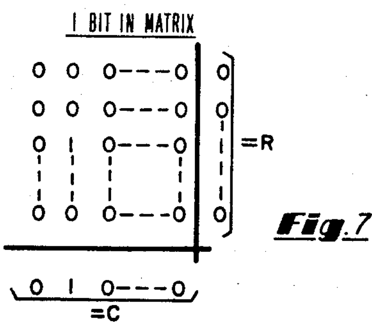
FIG. 7 is a matrix configuration exhibiting a valid condition in accordance with the teachings of this invention.
Figure 5:
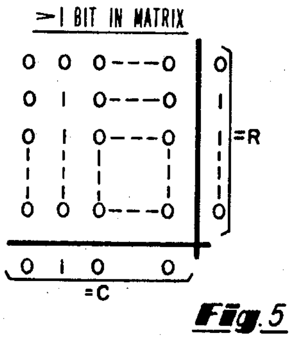
FIGS. 4, 5 and 6 are matrix configurations exhibiting invalid, or error, conditions in accordance with the teachings of this invention.
Figure 4:
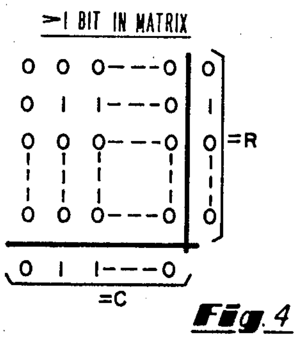
Figure 6:
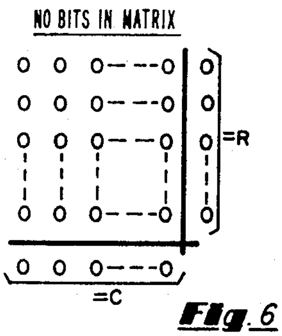

Examples of error conditions in a single matrix gating circuit of greater than one bit (two examples), no bits, and an example of the valid condition of only one bit are shown, respectively, in the matrices of the respective FIGS. 4, 5, 6 and 7. In FIG. 4, the output R, when checked, indicates a valid state, while the output C indicates the invalid, or error, state. In FIG. 5, the output C, when checked, indicates a valid state, while the output R indicates the invalid, or error, state. In FIG. 6, both the output C and the output R indicate the state of no bits and therefore an error condition is present in the matrix. In FIG. 7, both outputs C and R indicate a valid state of only one bit being present in the matrix.

As previously mentioned, if the number of lines is low enough, a single matrix gating circuit 14 can be used as illustrated in FIG. 1. If a large number of lines are to be checked and a plurality of matrix gating circuits 14 are to be used (such as in FIG. 2) and the outputs R and C of each separate matrix circuit are checked by its associated error detection circuits 12 to see if there is more than one bit input to any one matrix gating circuit. The error detection circuits 12 also are interconnected to determine if: (1) there is one bit to more than one matrix gating circuit, and (2) there is no bit inputs to any of the matrix gating circuits.

These two matrix outputs R and C are the vehicles by which a determination is made whether a valid condition exists. Two different techniques, designated as a decoding technique and a comparison technique, each comprising a different logic circuit means, are available for accomplishing this determination. The decoding technique requires R R-input NAND gate circuits and C C-input NAND gate circuits wherein R and C are, respectively, the number of rows and columns in the matrix. The individual outputs R1, R2...R16 are decoded using a first plurality of NAND gate circuits, such that each gate circuit includes the status of the bits of information in a group of sixteen leads. The output signals of the first plurality of NAND gate circuits are impressed on a NAND gate circuit which decodes the input signals to see if at least one bit is present in the matrix output R. In the same manner, the matrix outputs C are decoded. The output signals of the gate circuits of the matrix outputs R and C are then gated together to determine whether one bit, more than one bit, or no bits are present in both of the matrix outputs R and C. A condition other than one bit being present in the matrix gating circuit will constitute an error, or alarm condition.

Figure 8:
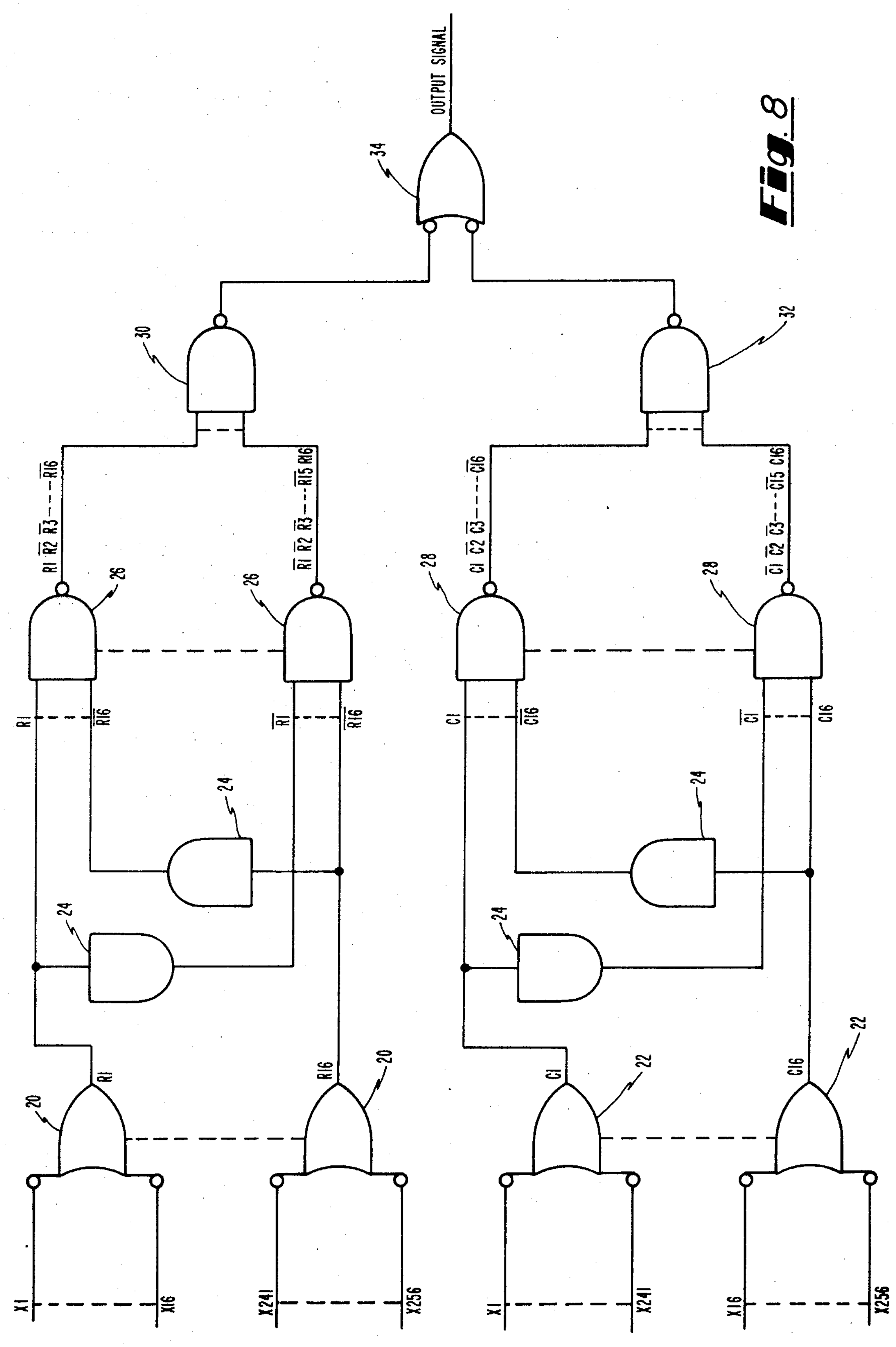
FIG. 8 is a schematic of a decoding technique for detecting other than one-bit-out-of-N bits of information.

To illustrate this decoding technique, a reference is made to the FIGS. 1, 3 and 8. In FIG. 3, each of the rows and the columns of the matrix gating circuit contains 16 bits. The matrix output R is derived by employing 16—16 input NOR gate circuits 20 (FIG. 7) to obtain the 16 outputs R1, R2, R3...R16. In the same manner, the matrix output C is derived by sixteen-sixteen input NOR gate circuits 22 (FIG. 7) deriving the sixteen outputs C1, C2, C3...C16. For purposes of simplifying the illustration, only two NOR gate circuits 20 and two NOR gate circuits 22 are shown, however, it is understood that in this particular example, a total of thirty-two sixteen input NOR gate circuits would be employed, sixteen for the matrix output R and 16 for the matrix output C. To perform the binary decoding of the outputs R1...R16, and C1...C16, the complement of each of the outputs is formed by a separate one of 32 inverters 24 (four of which are shown). The 16 possible valid states of each of the matrix outputs R and C is then determined by employing two pluralities of NAND gate circuits 26 and 28. 16—16 input NAND gate circuits 26 are connected to the outputs of the NOR gate circuits 20, while 16—16 input NAND gate circuits 28 are connected to the outputs of the NOR gate circuits 22. For purposes of simplifying the illustration, only two of NAND gate circuits 26 and 28 are shown. One input of each of the NAND gate circuits 26 is directly connected to the output of a separate one of the NOR gate circuits 20, while the other inputs are connected to the other ones of the NOR gate circuits 20 via the 16 inverters 24. One input of each of the NAND gate circuits 28 is directly connected to the output of a separate one of the NOR gate circuits 22, while the other inputs are connected to the other ones of the NOR gate circuits 22 via the sixteen inverters 24. Hence, each NAND gate circuit receives a direct input and fifteen inverted inputs.

The output signals of the NAND gates 26 and 28 are then decoded by two-sixteen input NAND gate circuits 30 and 32, respectively, to find whether or not one, and only one, bit of information is present in the respective rows and columns in the matrix gating circuit. The output signal of each of the NAND gate circuits 30 and 32 is connected to an input to an NOR gate circuit 34. The output signal of the NOR gate 34 indicates an alarm signal when less than one, or more than one, bit of information is present on the lines X1–X256. Assuming the presence of a bit is signified by a low signal, the arrangement is such that no bits of information on the lines X1–X256 produces a low signal (alarm) from both of the NAND gate circuits 30 and 32 and two bits on separate ones of the lines X1–X256 produces a low signal (alarm) from one of the NAND gate circuits 30 and 32. A low signal output from either gate circuit 30 or 32, or both, produces an alarm signal from the NOR gate circuit 34.

Figure 9:
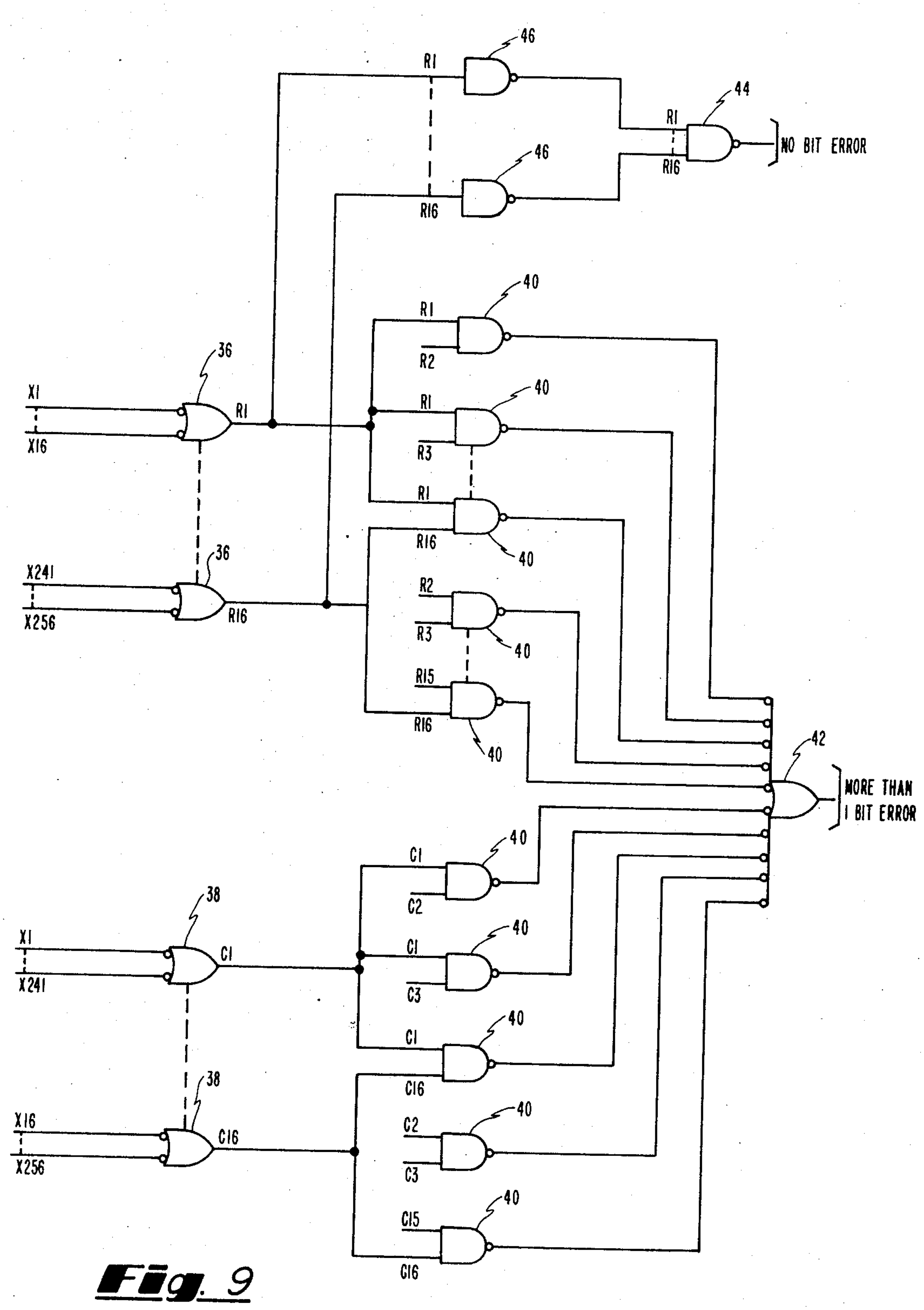
FIG. 9 is a schematic of a second embodiment of the invention using a comparison technique.

Referring now to FIGS. 1, 3 and 9, there is shown a comparison technique of this invention for determining the status of bits of information on lines X1–X256 employing the matrix configuration of FIG. 3. The individual outputs of the binary numbers R and C are formed in the exact same manner as in the prior decoding technique, employing 16—16 input NOR gate circuits 36 to form the matrix output signals R1–R16 and 16—16 input NOR gate circuits 38 to form the matrix output signals C1–C16. Each matrix output R1–R16 is compared with each other. Each matrix output C1–C16 is also compared with each other.

A plurality of NAND gates 40 (only twelve are shown for simplifying the illustration) are required for the comparison of the bits. The total required number of NAND gates 40 is equal to:

$$R!/(2!(R-2)!) \qquad 1$$

where R is the number of rows in the matrix configuration, and $$C!/(2!(C-2)!) \qquad 2$$

where C is the number of columns in the matrix configuration.

The outputs of each of the NAND gates 40 are OR'ed together by a NOR gate circuit 42. If any of the NAND gates 40 is enabled, the output signal of the OR gate 42 indicates an error condition. In the case of the zero bit check, each of the outputs of the NOR gate circuit 36 (R1–R16) are connected through separate inverter circuit 46 to a NAND gate circuit 44 to provide a "no bit" error signal when no bits are present on the lines X1–X256. Although the "no bit" error check is shown in conjunction with the NOR gate circuit 36, it is to be understood that it may also be employed with the NOR gate.

Figure 2:
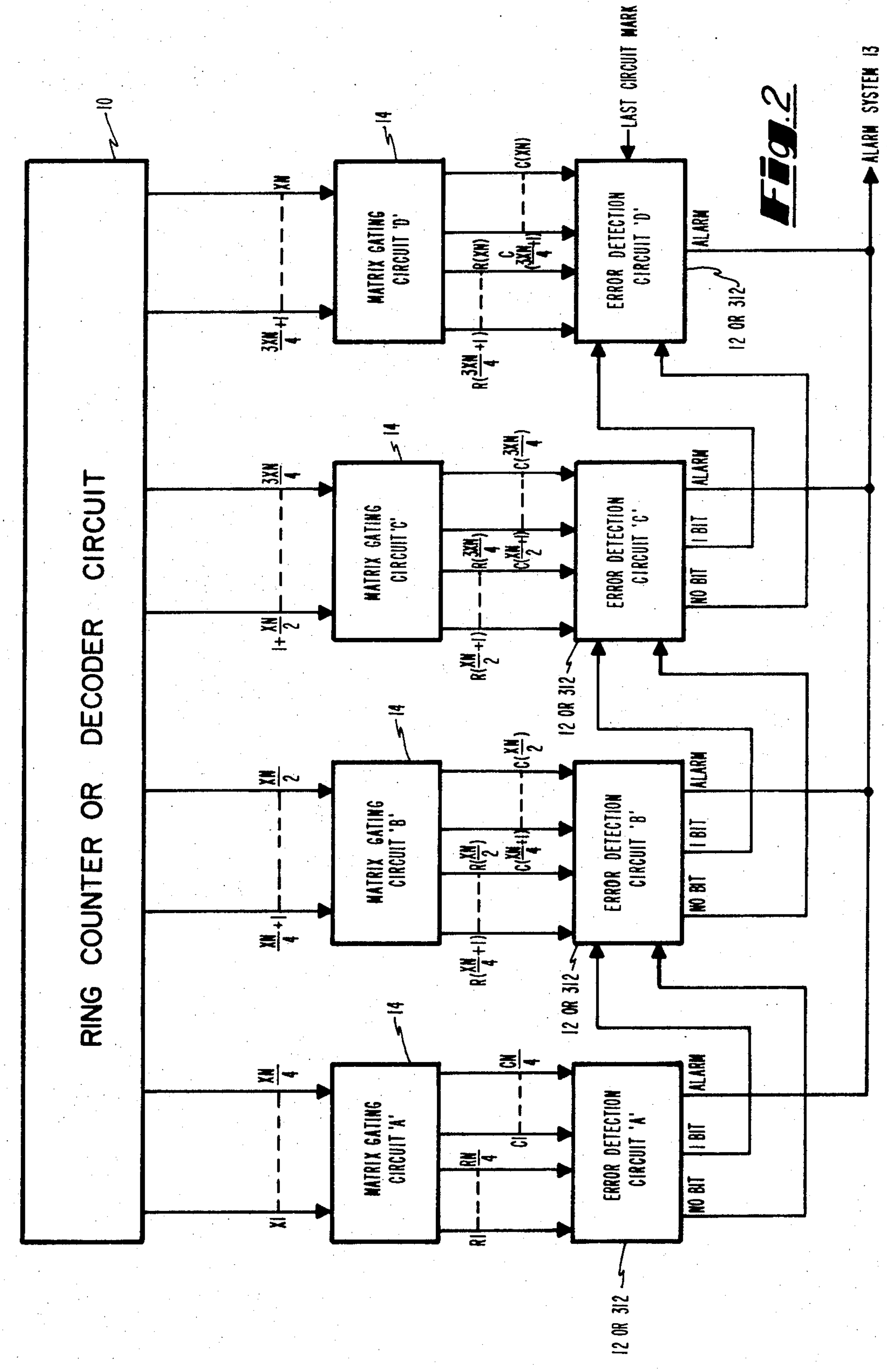
FIG. 2 is a block diagram of the means for detecting other than one-bit-out-of-N bits of information in accordance with the teachings of this invention expanded to include a plurality of matrix gating circuits and error detection circuits in the event a large number of lines are to be checked.

Referring again to the logic number of the line arrangement of FIG. 2, each of the matrix gating circuits 14 has its own associated error detection circuit 12 for determining the status of the bits received by its matrix gating circuit. Each error detection circuit embodies either the decoding technique of FIG. 8 or the comparison technique of FIG. 9. The four error detection circuits A, B, C and D are interconnected for sequentially passing onto the next error detection circuit or circuits, in sequence, signals corresponding to the absence of any bits or the presence of bits in the matrix gating circuit associated with the error detection circuits. If an alarm condition of more than one bit of information is received by a matrix gating circuit 14 and is detected by any one of the error detection circuits, the alarm system is immediately actuated by that particular error detection circuit. The error detector circuits 12 are also interconnected to transmit signals therebetween so that the presence of a bit signal to more than one matrix gating circuit, or the absence of any bits to any matrix gating circuit, is also recognized as an error condition.

Figure 10:
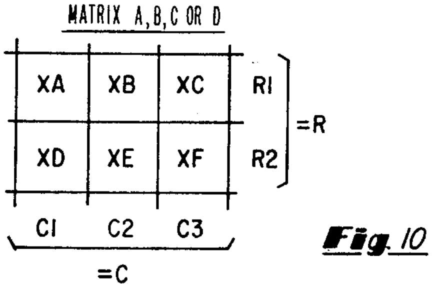
FIG. 10 is another matrix configuration used for explaining the operation of FIGS. 11 and 12.

To illustrate a basic operation of the logic circuitry associated with the error detection circuits 12 of FIG. 2, one may consider the example wherein each of the matrix gating circuits 14 (A, B, C and D) handles six input lines XA, XB, XC, XD, XE and XF in a three by two matrix arrangement as illustrated in FIG. 10. Each of the six leads XA, XB, XC, XD, XE and XF has impressed thereon the presence or absence of a bit of information. For example, the presence of a bit imparts a low signal while the absence of a bit imparts a high signal. Each of the error detection circuits 12 is capable of actuating an alarm system immediately if an error condition of two or more bits is indicated by its associated matrix 14. Additionally, each error detection circuit 12 will actuate an alarm system if one bit is indicated by its associated matrix gating circuit and one bit is present in a previously checked matrix gating circuit. Further, the error detection circuit 12 associated with the last matrix gating circuit 14 (D) actuates an alarm if no bit is present in its associated matrix gating circuit and no bits have been found in all of the previously checked matrix gating circuits.

Figure 11:
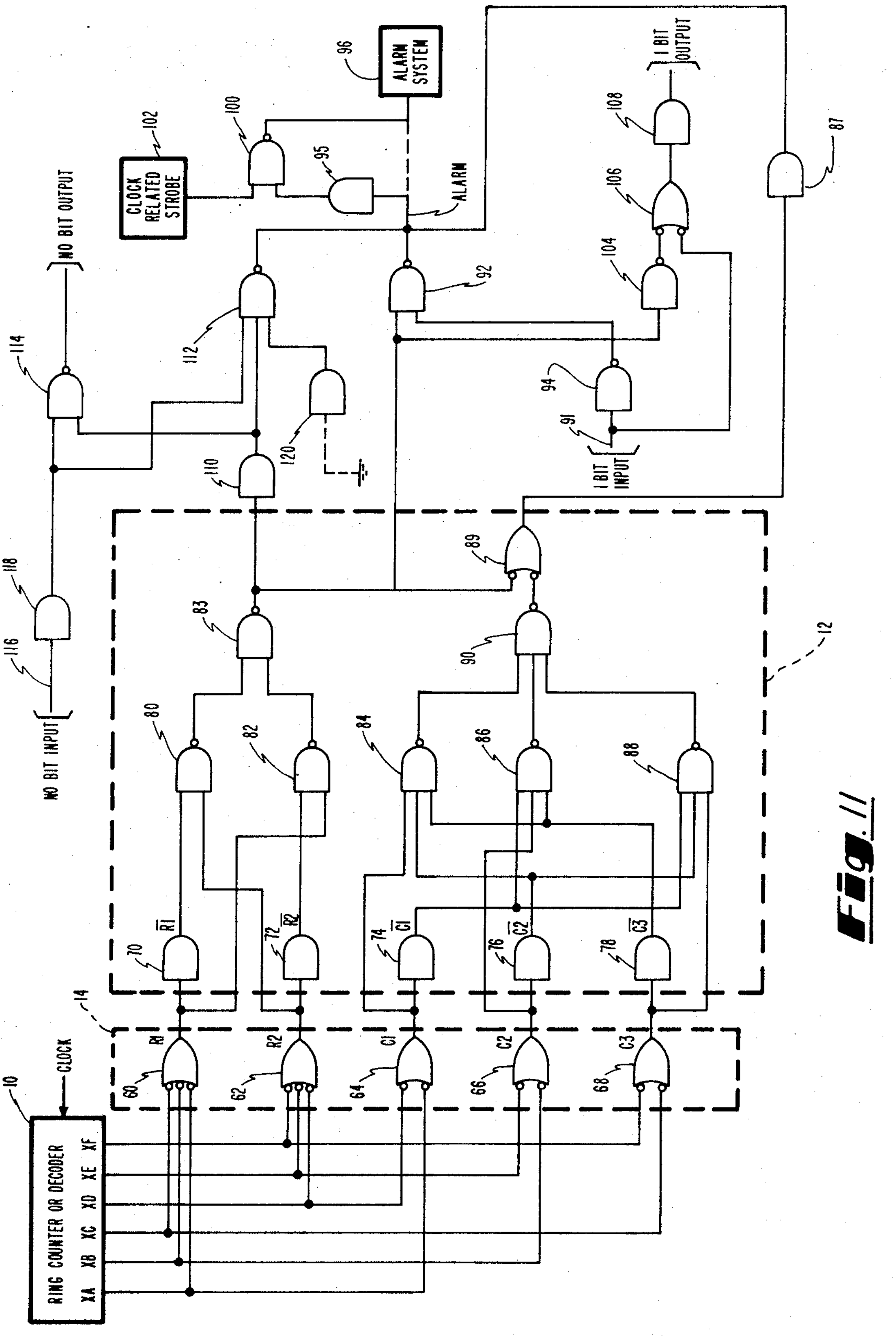
FIG. 11 is a schematic diagram of the combined matrix gating circuit and error detection circuit for detecting other than one-bit-out-of-N bits including the decoding technique of FIG. 7.

Referring now to FIG. 11, the NOR gates 60–68 form the matrix gating circuit 14. The data output leads XA, XB and XC are OR'ed together by a NOR gate 60 to form the output R1. The data outputs XD, XE and XF are OR'ed together by a NOR gate 62 to form the output R2. Similarly, the data output leads XA and XD, XB and XE, and XC and XF, are OR'ed together by the respective NOR gates 64, 66 and 68, to form the outputs C1, C2 and C3, respectively.

The error detection circuit 12 forms complements of the outputs R1 and R2 through use of the inverters 70 and 72, respectively. Complements of the outputs C1, C2 and C3 are formed by the inverters 74, 76 and 78, respectively. The signals R2 $\overline{R1}$ are applied to the inputs of a NAND gate 80, the signals R1 $\overline{R2}$ are applied to a NAND gate 82. The output circuits of the NAND gates 80 and 82 are connected to a NAND gate 83. The arrangement is such that a low signal is generated by the NAND gate 83 if no bits and/or two bits are found in the matrix outputs R1 and R2. The signals C1, $\overline{C2}$ and $\overline{C3}$ are applied to the input circuits of a NAND gate 84. The signals $\overline{C1}$, C2 and $\overline{C3}$ are applied to the input circuits of a NAND gate 86. The signal $\overline{C1}$, $\overline{C2}$ and C3 are applied to the input circuits of a NAND gate 88. The outputs of the gates 84, 86 and 88 are connected to the input circuits of a NAND gate 90 such that a low signal is generated by the NAND gate 90 if no bits and/or two or more bits are formed in the matrix outputs C1, C2 and C3. The outputs of the NAND gates 83 and 90 are connected to the inputs of a NOR gate 89, which applies the error signal condition through an inverter 87 either directly to an alarm system 96 (shown dashed) or through an inverter 98 and a NAND gate 100 to the alarm system 96. A clock related strobe circuit 102 impresses a periodic signal pulse on the NAND gate 100 so that the alarm system is actuated only when the NAND gate 100 is strobed.

The output signal of the NAND gate 83 is also applied to the input circuit of a NAND gate 92. A signal from the immediate preceding error detection circuit is impressed via line 91 and an inverter 94 to the other input circuit of the NAND gate 92 indicating that a signal bit has been detected in a prior circuit. The output signal of the NAND gate 92 is connected to the alarm circuitry. An alarm condition exists if: (1) a signal indicating a bit is present on line 91 from one of the previous error detection circuits, and (2) a signal indicating one bit is present in the current associated matrix gating circuit. There is no alarm condition if no bit is present in the current matrix gating circuit being checked and one bit is present in the prior checked matrix gating circuits and vice versa. The output signal of the NAND gate 83 is also impressed through an inverter 104 to an OR gate 106. The signal from the immediate preceding error detection circuit on line 91 is also applied to the OR gate 106. The output signal of the OR gate 106 is transmitted through an inverter 108 to the corresponding line 91 of the next error detection circuit. The function of the OR gate 106 is to indicate to the next error detection circuit that either one bit is, or no bits are, present in the previous matrix gating circuits.

Figure 12:
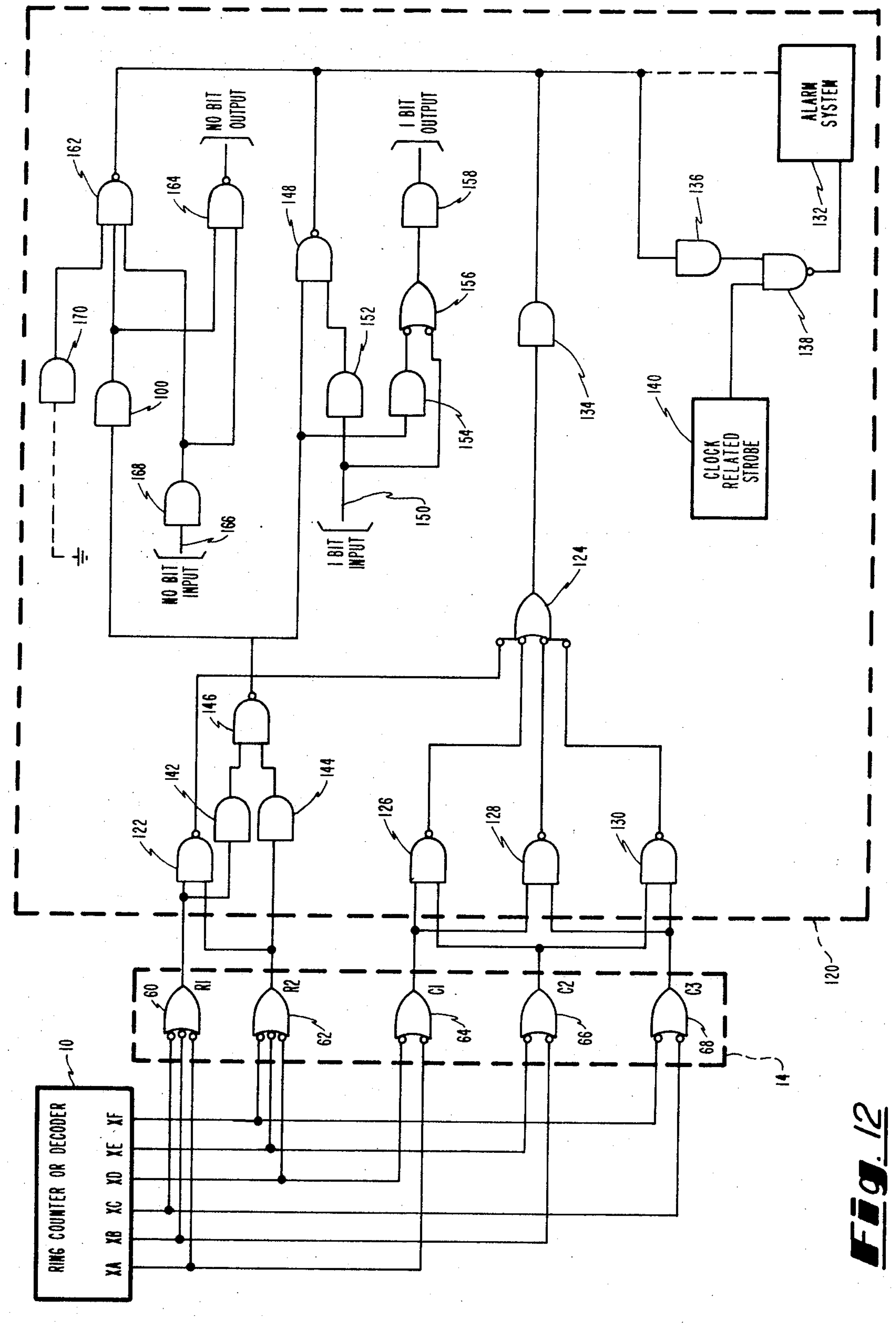
FIG. 12 is a schematic of the combined matrix gating circuit and error detection circuit for detecting other than one-bit-out-of-N bits including the comparison technique of FIG. 9.

The output signal of the NAND gate 83 is also applied through an inverter 110 to a NAND gate 112 and also to a NAND gate 114. A signal indicating a "zero bit" condition of the immediate preceding checker 12 is impressed via a line 116 to an inverter 118 to the NAND gates 112 and 114. If no bits are present in the current associated matrix gating circuit being checked, and if no bits are detected in the previously checked matrix gating circuits, a "zero bit" signal is transmitted by the NAND gate 114 to the line 116 of the next error detection circuit. If the current error detecting circuit 12 is the last one in the series (14D), a signal is also impressed through an inverter 120 to the NAND gate 112 for enabling the gate. If no bits have been found in any of the matrix gating circuits, the alarm system 96 is actuated. With reference to FIG. 12, the comparison technique is shown employed with the matrix gating circuit 14 along with an error detection circuit 120. To illustrate a basic operation of the logic circuitry associated with the error detection circuits 120, as employed with signal circuit 10 of FIG. 2, one may consider the example wherein each of the matrix gating circuits 14A, 14B, 14C and 14 D handles six separate input lines XA, XB, XC, XD, XE and XF in a three by two matrix arrangement as illustrated in FIG. 10. Each of the six leads XA, XB, XC, XD, XE and XF has impressed thereon the presence or absence of a bit of information. For example, the presence of a bit imparts a low signal while the absence of a signal imparts a high signal. Each of the error detecting circuits 120 is capable of actuating an alarm system immediately if an error condition of two or more bits is indicated by its associated matrix gating circuit 14. Additionally, each error detection circuit 120 will actuate an alarm system if one bit is indicated by its associated matrix gating circuit 14 and one bit is present in a previously checked matrix gating circuit 14. Further, the error detection circuit 120 associated with the last matrix gating circuit 14D actuates an alarm if no bit is present in this last matrix gating circuit and no bits have been found previously in all of the prior checked matrix gating circuits.

Here again, the NOR gates 60–68 of the matrix gating circuit 14, in the exact same manner as previously described with reference to the matrix gating circuits 14 of FIG. 11, forms the matrix outputs R1, R2, C1, C2 and C3.

The error detection circuit 120 compares each of the signal outputs R1, R2, C1, C2 and C3 with each of the other signal outputs of the matrix output signals R or C. Employing the formula (1), it is found that one NAND gate circuit 122 is required to compare the two output signals R1 and R2 with each other. The arrangement is such that a low signal is generated when more than one bit is present in the matrix outputs R1 and R2. The output signal of the NAND gate circuit 122 is applied to the input circuits of an OR gate circuit 124. Employing the formula (2), wherein C=3, it is found that three NAND gate circuits 126, 128 and 130 are required for a complete comparison of the output signals C1, C2 and C3. The NAND gate circuit 126 compares the output signals C1 and C2 with each other. The NAND gate circuit 128 compares the output signals C1 and C3 with each other. The NAND gate circuit 130 compares the output signals C2 and C3 with each other. The arrangement is such that a low signal is generated by one of the NAND gate circuits 128–130 when more than one bit is present in the matrix gating circuit output signals. The output signals of each of the NAND gate circuits 126, 128 and 130 is applied to the input circuits of the OR gate circuit 124. The arrangement of the OR gate circuit 124 is such that a high output signal is generated when two or more bits are present in the matrix gating circuit 14. The high signal is an alarm condition denoting an error condition and is employed to actuate an alarm system 132 either directly through an inverter circuit 134 or through inverter circuits 134 and 136 and a NAND gate circuit 138. A clock related strobe circuit 140 impresses a periodic pulse on the NAND gate circuit 138 so that the alarm system 132 is actuated only when the NAND gate circuit 138 is strobed.

Each of the output signals R1 and R2 and also applied through respective inverter gate circuits 142 and 144 to the input circuit of a NAND gate circuit 146 to provide a zero or no bit check. A low signal output from the NAND gate circuit 146 signifies the absence of any bits in the matrix gating circuit 14. A high signal output signifies the presence of at least one bit in the circuit 14. The output signal of the NAND gate circuit 146 is applied to one input circuit of a NAND gate circuit 148. A signal from the immediate preceding error detection circuit is impressed via line 150 through an inverter circuit 152 to the other input circuit of the NAND gate circuit 148 indicating that a signal bit has been detected in a prior circuit. The output signal of the NAND gate circuit 148 is connected to the alarm circuitry. An alarm condition exists if: (1) a signal indicating a bit is present on line 150 from one of the previous error detection circuits, and (2) a signal indicating one bit is present in the current associated matrix gating circuit. There is no alarm condition from gate 148 if no bit is present in the current matrix gating circuit being checked and one bit is present in the prior checked matrix gating circuits and vice versa. The output signal of the NAND gate circuit 146 is also impressed through an inverter circuit 154 on the input circuits of an OR gate circuit 156. The signal from the immediate preceding error detection circuit on line 150 is also applied on the input circuits of the OR gate circuit 156. The output signal of the OR gate circuit 156 is transmitted through an inverter circuit 158 to the corresponding line 150 of the next error detection circuit. The function of the OR gate 156 is to indicate to the next error detection circuit that either one bit is, or no bits are, present in the previous matrix gating circuits.

The output signal of the NAND gate circuit 146 is also applied through an inverter circuit 160 to the input circuit of a NAND gate circuit 162 and also to an input circuit of a NAND gate circuit 164. A signal indicating a "zero" or "no bit" condition of the immediate preceding error detection circuit 120 is impressed via a line 166 via an inverter circuit 168 to the input circuits of the NAND gate circuits 162 and 164. If no bits are present in the current associated matrix gating circuit being checked, and if no bits are detected in the previously checked matrix gating circuits, a "zero" or "no bit" signal is transmitted by the NAND gate circuit 164 to the line 166 of the next error detection circuit. If the current error detecting circuit 120 is the last one in the series (14D), a signal is also impressed through an inverter circuit 170 (as designated by dashed lines) to the NAND gate circuit 162 for enabling the gate. If no bits have been found in any of the matrix gating circuits, the alarm system 132 is actuated.

There are several advantages of the two checking techniques described for detecting the only valid condition of one-out-of-N bits in the associated matrix gating circuits 14 of the signal circuit 10. The techniques of this invention provide an advantage of high-speed operation in the parallel error detection operation of the associated matrices 14. Additionally, the logic circuitry employed in the techniques of this invention is considerably less than those circuits employed in similar prior art techniques. Although the invention has been described primarily with the use of NAND gate circuits and NOR gate circuits, it should be understood that other circuit arrangements are also possible. For example, the logic circuitry described can be rearranged to enable one to employ principally AND gate circuits and OR gate circuits as well as relay circuits.

What is claimed is:

1. A circuit for monitoring a plurality of input signal lines for a valid condition defined by the presence of a single signal on any one of the plurality of input signal lines comprising:

first gating circuit means for receiving signals from said input signal lines and combining the signals in a matrix arrangement, including two separate groups of a plurality of matrix output signal lines and arranged so that a signal on any of the input signal lines is transmitted to a matrix output signal line in each of the two groups, and second gating circuit means connected to the matrix output signal lines of both groups for providing a first control signal indicating a valid condition when only one matrix output line in each of the groups has a signal thereon and a second control signal indicating an error condition when none or more than one of the matrix output lines in either of the groups have signals thereon.

2. A circuit as defined in claim 1 wherein said second gating circuit means includes:

third gating circuit means connected to the matrix output signal lines of a first one of said groups so that the third gating circuit means provides a third signal indicating a signal is present on only one of the matrix output signal lines in the first group;

fourth gating circuit means connected to the matrix output signal lines of the second one of said groups so that the fourth gating circuit means provides a fourth signal indicating a signal is present on only one of the matrix signal lines in the second group, and fifth gating circuit means connected to said third and fourth gating circuit means for providing said first control signal in response to the third and fourth signals from both the third and fourth gating circuit means, and said second control signal in absence of at least one of said third and fourth control signals.

3. A circuit as defined in claim 1 wherein said second gating circuit means includes:

third gating circuit means connected to the matrix output signal lines of a first one of said groups so that the third gating circuit means provides a third signal having a first form if a signal is present on only one of the matrix output signal lines and a second form if a signal is present on more than one matrix output signal line;

fourth gating circuit means connected to the matrix output signal lines of the second one of said groups so that the fourth gating circuit means provides a fourth signal having a first form if a signal is present on only one of the matrix output signal lines and a second form if a signal is present on more than one of the matrix output signal lines;

fifth gating circuit means connected to the matrix signal lines of at least one of said first and second groups for providing a fifth signal when no signals are present on any one of the connected matrix output signal lines, and sixth gating circuit means connected to said third, fourth and fifth gating circuit means for providing said first control signal in response to the first form of both of said third and fourth signals, and said second control signal in response to at least one of the fifth signals, second form of the third signal and second form of the fourth signal.

4. A circuit for monitoring a plurality of input signal lines for a valid condition defined by the presence of a single signal on any one of the plurality of input signal lines comprising:

a plurality of gating circuit means connected to separate groups of input circuit lines, each of said gating circuit means providing a first signal if a signal is present on more than one input signal line connected thereto, a second signal if no signals are present on any of the input signal lines connected thereto, and a third signal if one signal is present on only one of the input signal lines connected thereto;

circuit means connected to said plurality of gating circuit means responsive to the presence of third signals from at least two of said gating circuit means for generating a fourth signal;

circuit means connected to said plurality of gating circuit means for detecting the presence of a second signal from each of the plurality of gating circuits for generating a fifth signal, and circuit means responsive to any one of said first, fourth and fifth signals for providing an error signal.

5. A circuit as defined in claim 4 wherein each of said gating circuit means includes:

a first gating circuit for receiving signals from the input signal lines connected thereto and combining the signals in a matrix arrangement including two separate groups of a plurality of matrix output signal lines arranged so that a signal on any of the input signal lines connected thereto is transmitted to a matrix output signal line in each of the two groups, and a second gating circuit connected to the matrix output signal lines of both groups and being responsive to signals thereon to provide said first, second and third signals.

6. A circuit as defined in claim 5 wherein said second gating circuit includes:

a third gating circuit connected to the matrix output signal lines of a first one of said groups so that the third gating circuit provides a sixth signal indicating a signal is present on only one of the matrix output signal lines in the first group;

a fourth gating circuit connected to the matrix output signal lines of the second one of said groups so that the fourth gating circuit provides a seventh signal indicating a signal is present on only one of the matrix signal lines in the second group, and a fifth gating circuit connected to said third and fourth gating circuit responsive to said sixth and seventh signals for providing said first, second and third signals.

7. A circuit as defined in claim 5 wherein said second gating circuit includes:

a third gating circuit connected to the matrix output signal lines of a first one of said groups so that the third gating circuit provides a sixth signal having a first form if a signal is present on only one of the matrix output signal lines and a second form if a signal is present on more than one matrix output signal line;

a fourth gating circuit connected to the matrix output signal lines of the second one of said groups so that the fourth gating circuit provides a seventh signal having a first form if a signal is present on only one of the matrix output signal lines and a second form if a signal is present on more than one of the matrix output signal lines;

a fifth gating circuit connected to the matrix signal lines of at least one of said first and second groups for providing said second signal when no signals are present on any one of the connected matrix output signal lines, and sixth gating circuit connected to said third and fourth gating circuits for providing said third signal in response to the first form of both of said sixth and seventh signals, and said first signal in response to at least one of the second form of the sixth signal and second form of the seventh signal.

* * * * *